US007886918B1

(12) United States Patent
Sauer et al.

(10) Patent No.: US 7,886,918 B1
(45) Date of Patent: Feb. 15, 2011

(54) MULTI PURPOSE RECREATIONAL VEHICLE GARMENT BAR

(76) Inventors: Steven J. Sauer, 1350 Basin Dr., Lake Havasu City, AZ (US) 86404; Edward J. Sauer, 1350 Basin Dr., Lake Havasu City, AZ (US) 86404

( * ) Notice: Subject to any disclaimer, the term of this patent is extended or adjusted under 35 U.S.C. 154(b) by 0 days.

(21) Appl. No.: 12/542,485

(22) Filed: Aug. 17, 2009

(51) Int. Cl.
*A47H 1/00* (2006.01)
*A01K 97/10* (2006.01)

(52) U.S. Cl. .......................... 211/99; 248/534; 248/538

(58) Field of Classification Search ............... 211/1.3, 211/96, 97, 98, 99, 100, 101, 102, 104, 105.1, 211/119.1, 123, 165, 171, 172; 248/291.1, 248/294.1, 298.1, 353, 629, 295.11, 304, 248/534, 538; 223/85, 88, 89, 94
See application file for complete search history.

(56) References Cited

U.S. PATENT DOCUMENTS

| | | | | |
|---|---|---|---|---|
| 76,756 | A * | 4/1868 | Hancock | 211/97 |
| 181,442 | A * | 8/1876 | Howell | 211/99 |
| 257,631 | A * | 5/1882 | Abbey | 211/101 |
| 288,320 | A * | 11/1883 | Eckert et al. | 379/454 |
| 326,742 | A * | 9/1885 | Iske | 211/101 |
| 544,713 | A * | 8/1895 | Wynkoop | 211/97 |
| 624,908 | A * | 5/1899 | Conchar | 211/99 |
| 660,316 | A * | 10/1900 | Shoenberg | 248/294.1 |
| 858,159 | A * | 6/1907 | Deis | 211/165 |
| 895,905 | A * | 8/1908 | Soraghan | 211/99 |
| 909,114 | A * | 1/1909 | Pitts | 211/9 |
| 971,493 | A * | 9/1910 | Crane | 211/99 |
| 975,273 | A * | 11/1910 | Noppe | 211/97 |
| 984,556 | A * | 2/1911 | Gehrke | 211/165 |
| 1,040,462 | A * | 10/1912 | Thruman | 248/216.4 |
| 1,204,010 | A * | 11/1916 | Gore | 211/99 |
| 1,318,257 | A * | 10/1919 | Blaustein | 211/99 |
| 1,339,833 | A * | 5/1920 | Saltmarsh et al. | 248/514 |
| 1,352,556 | A * | 9/1920 | Soule | 211/104 |
| 1,353,287 | A * | 9/1920 | Stein | 211/99 |
| 1,361,739 | A * | 12/1920 | Matheson | 211/99 |
| 1,367,629 | A * | 2/1921 | Shoemaker | 211/104 |
| 1,373,460 | A * | 4/1921 | Striker et al. | 211/99 |
| 1,377,444 | A * | 5/1921 | Shoemaker | 211/104 |
| 1,522,873 | A * | 1/1925 | Doering | 211/99 |
| 1,557,251 | A * | 10/1925 | Hamlin | 211/85.3 |
| 1,582,762 | A * | 4/1926 | Klock | 211/99 |
| 1,587,676 | A * | 6/1926 | Patterson | 211/1.3 |
| 1,705,203 | A * | 3/1929 | Patterson | 211/1.3 |
| 1,836,008 | A * | 12/1931 | Anzalone | 211/94.03 |
| 1,995,980 | A * | 3/1935 | Haymond | 211/99 |
| 2,099,495 | A * | 11/1937 | Mirel | 211/97 |
| 2,142,830 | A * | 1/1939 | Wendell | 211/100 |
| 2,434,891 | A * | 1/1948 | Swanson | 211/97 |

(Continued)

FOREIGN PATENT DOCUMENTS

DE 20201904 U1 * 8/2002

*Primary Examiner*—Darnell M Jayne
*Assistant Examiner*—Joshua Rodden (57) ABSTRACT

The present invention is a multi-purpose recreational vehicle garment bar that incorporates important convenience features for a user. It includes convenient methods of suspending the support base from a recreational vehicle, and optionally, from other fixed structures typically found at a recreational vehicle parking area. Also included in the design are screwdriver holders and an end flag holder which provide important convenience and decorative features for the end user.

12 Claims, 8 Drawing Sheets

U.S. PATENT DOCUMENTS

| | | | | |
|---|---|---|---|---|
| 2,469,098 | A * | 5/1949 | Archie | 211/105.2 |
| 2,483,242 | A * | 9/1949 | Smith | 211/1.3 |
| 2,508,871 | A * | 5/1950 | Stein | 211/100 |
| 2,518,370 | A * | 8/1950 | Pincus et al. | 211/100 |
| 2,575,112 | A * | 11/1951 | Kruger | 211/96 |
| 2,615,579 | A * | 10/1952 | Sampson | 211/100 |
| 2,626,714 | A * | 1/1953 | Rover | 211/100 |
| 2,666,530 | A * | 1/1954 | Beren | 211/99 |
| 2,672,241 | A * | 3/1954 | Cohen et al. | 211/100 |
| 2,675,923 | A * | 4/1954 | Humphrey | 211/96 |
| 2,734,639 | A | 2/1956 | Green | |
| 2,778,705 | A * | 1/1957 | Barker | 312/313 |
| 2,895,618 | A * | 7/1959 | Nathan | 211/123 |
| 3,032,273 | A * | 5/1962 | Spielman | 239/57 |
| 3,211,295 | A * | 10/1965 | Weiss | 211/100 |
| 3,249,233 | A * | 5/1966 | Marcus et al. | 211/105.3 |
| 3,481,483 | A * | 12/1969 | Hill et al. | 211/105.3 |
| 3,599,599 | A * | 8/1971 | Jones | 116/173 |
| 4,051,953 | A * | 10/1977 | Shoaf | 211/119.1 |
| 4,094,414 | A * | 6/1978 | Thiot et al. | 211/1.3 |
| 4,126,231 | A * | 11/1978 | Derwent-Wryde | 211/99 |
| 4,129,217 | A * | 12/1978 | Campbell | 211/95 |
| 4,171,748 | A * | 10/1979 | Fabian | 211/1.3 |
| 4,574,961 | A * | 3/1986 | Keiels et al. | 211/119.01 |
| 4,632,255 | A * | 12/1986 | Kennedy | 211/1.3 |
| 4,760,929 | A * | 8/1988 | Fedorchak | 211/123 |
| 4,778,089 | A * | 10/1988 | White et al. | 224/561 |
| 4,805,786 | A * | 2/1989 | Miller | 211/105.1 |
| 4,856,546 | A * | 8/1989 | Kummunsalo | 135/15.1 |
| 4,856,661 | A | 8/1989 | Guillen et al. | |
| D307,359 | S * | 4/1990 | White | D6/323 |
| 4,920,910 | A * | 5/1990 | Lin | 116/173 |
| 5,005,512 | A * | 4/1991 | Fu | 116/173 |
| 5,014,954 | A * | 5/1991 | Merl | 248/285.1 |
| 5,165,555 | A | 11/1992 | Anatalio | |
| 5,249,770 | A * | 10/1993 | Louthan | 248/311.2 |
| 5,320,322 | A * | 6/1994 | Williams | 248/514 |
| 5,494,248 | A * | 2/1996 | Pratt et al. | 248/311.2 |
| 5,632,461 | A * | 5/1997 | von Helms et al. | 248/218.4 |
| 5,857,651 | A * | 1/1999 | Kunevicius | 248/230.8 |
| 6,059,240 | A * | 5/2000 | Gorsuch | 248/219.4 |
| D438,450 | S * | 3/2001 | Jones | D8/376 |
| 6,206,210 | B1 | 3/2001 | Reed | |
| 6,694,661 | B1 * | 2/2004 | Langford | 42/94 |
| 6,991,204 | B2 * | 1/2006 | Ay | 248/308 |
| 7,234,603 | B1 * | 6/2007 | Harris et al. | 211/100 |

* cited by examiner

MULTI PURPOSE RECREATIONAL VEHICLE GARMENT BAR

STATEMENT REGARDING FEDERALLY SPONSORED RESEARCH OR DEVELOPMENT

Not applicable.

CROSS REFERENCE TO RELATED APPLICATIONS

Not applicable.

REFERENCE TO SEQUENCE LISTING, A TABLE, OR COMPUTER PROGRAM LISTING

Not applicable.

BACKGROUND OF THE INVENTION (1) Field of the Invention

This application is directed to multipurpose items useful in a recreation vehicle (RV) setting, and for allowing the user to provide a number of useful functions in a compactly designed article. In particular, the collapsible article is carefully designed to provide a variety of important and useful functions that are important, desirable, convenient, or commonly needed in a RV Park or camp.

(2) Description of Related Art

U.S. Pat. No. 4,856,661 discloses a retractable clothes hanger that is useful for recreational vehicles. The unit is large, bulky, and is only designed for a single purpose. A relatively large amount of space needed for attachment. Similarly, U.S. Pat. No. 6,206,210 discloses a storage rack that could be adapted for clothes hanging that has similar problems. U.S. Pat. No. 5,165,555 provides similar storage capabilities, albeit with a stronger arm in the shape of an I beam, square tubing, or solid triangle. This also has problems with compactness, and does not provide additional important and convenient functions for the user.

U.S. Pat. No. 2,734,639 discloses a garment supporting bracket for automobile use. This bracket is not very useful, as disclosed, for a recreation vehicle because of limits in design due to its adaptations for use in an automobile. It is designed to rotate out of the way in the horizontal plane, and it is very small, only useful for a few garments. It is not useful in a recreational vehicle setting where the user will perform duties such as doing an entire load of laundry and then place much of that load on hangers to dry.

In prior disclosures for garment holders that might possible be useful in a recreational vehicle park setting, there is also lacking consideration for other convenience features that are useful in a recreation park setting. Two other important and convenient features include: screwdriver holder, and a flag holder.

It is important and helpful to provide the functions in a single convenient setting, rather provide each item in a separate piece that is attached ad hoc to the recreation vehicle. This provides a more pleasing and aesthetic appearance, as well as provide a known central point where all of these functions can be found.

BRIEF SUMMARY OF THE INVENTION

The present invention is a multi-purpose recreational vehicle garment bar that incorporates important convenience features for the user. It includes convenient methods of suspending the support base from the recreational vehicle, and optionally, from other fixed structures typically found at a recreational vehicle parking area. Also included in the design are consideration for incorporating screwdriver holders and an end flag holder which provide important convenience and decorative features for the end user.

DETAILED DESCRIPTION OF THE INVENTION

As an aid to the reader, the following is a list of part numbers and a brief description associated with the number.

| No | Description |
| --- | --- |
| 1 | Top Base |
| 2 | Bottom Base |
| 3 | Upper Hook |
| 4A | Screwdriver, Phillips |
| 4B | Screwdriver, Flat |
| 5 | Spring |
| 6 | Screw(s) |
| 7 | Non Skid Pad |
| 8 | Hook & Loop Strip |
| 9 | Magnet |
| 10 | Pivot Stop |
| 11 | Lower Hook |
| 12 | Pivot Shaft |
| 13 | Roll Pin |
| 14 | Pivot Tube |
| 15 | Telescoping Tube |
| 16 | Hose |
| 17A | End Insert A |
| 17B | End Insert B |
| 18 | Hook Extension |
| 19 | Flag |
| 24 | Pivoting Base |

Figure 1:
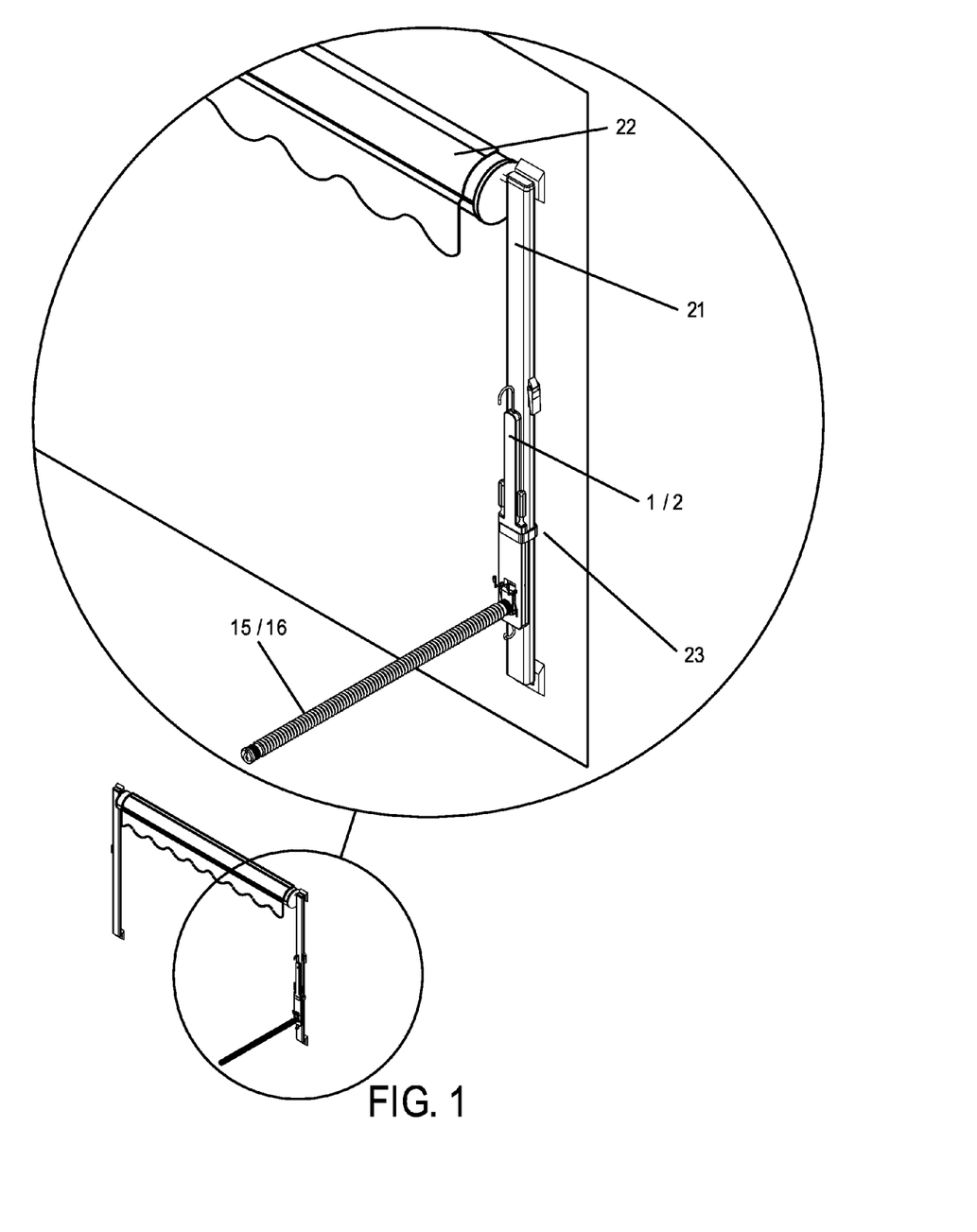
FIG. 1 shows the present invention rigidly mounted on an awning support.

FIG. 1 shows the present invention rigidly mounted on an awning support. An awning 22 is attached to the side of a recreational vehicle, and the multi purpose recreational vehicle garment bar (MPRVGB) is attached by use of a top base 1 and bottom base 2 to the vertical awning structural support 21. The extension tube 15 and hose 16 is shown rotated to the horizontal position. In this case, the base is attached to the awning structural support by a hook and loop strap 23.

Figure 2:
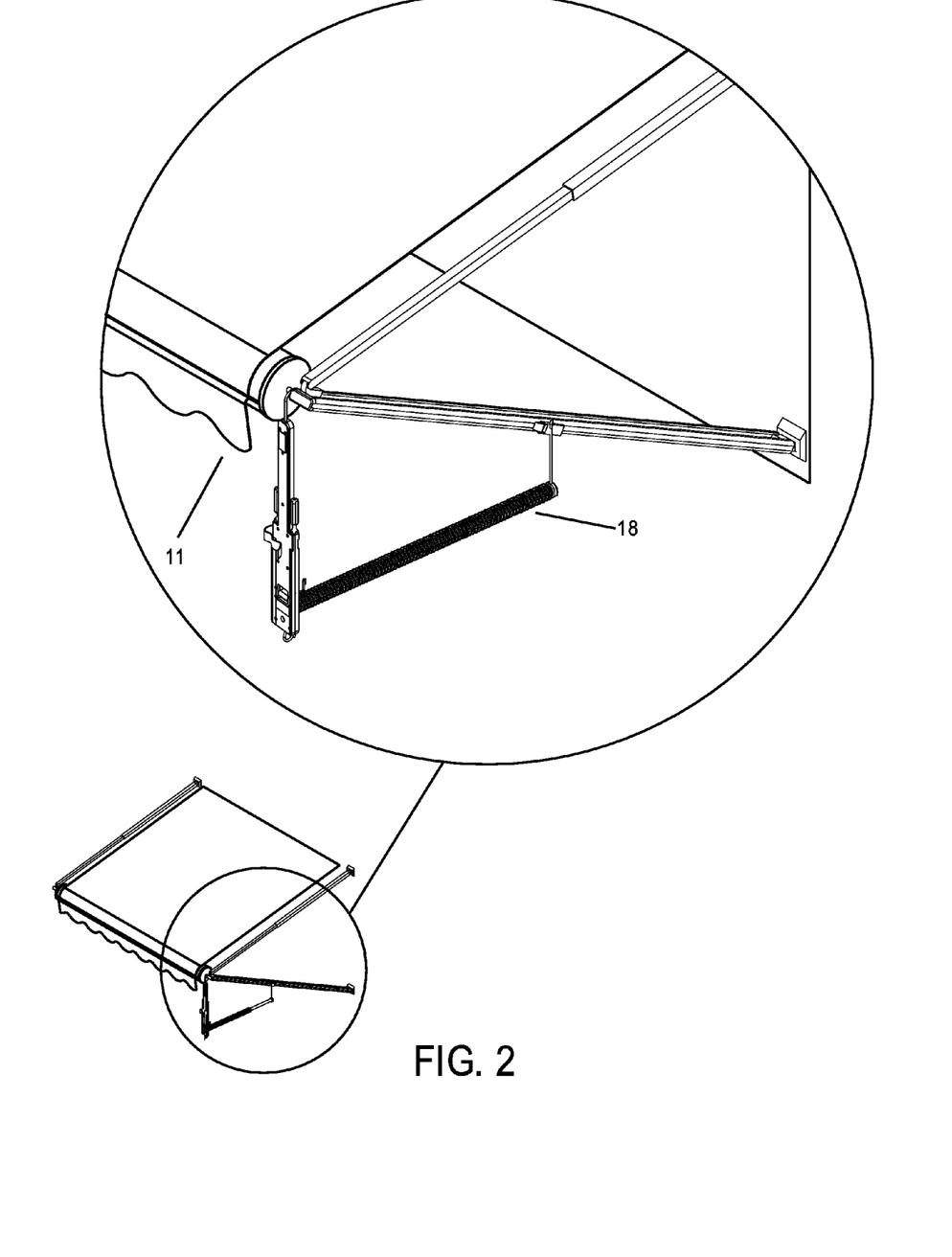
FIG. 2 shows an alternate embodiment of the present invention temporarily mounted on an awning support.

FIG. 2 shows an alternate embodiment of the present invention which is temporarily mounted on an awning support. An upper hook 3 at one end of the base, and an extending hook 18 at the free end of the telescoping tube are used to hang the MPRVGB underneath the awning. This provides extraordinary convenience, and simple stability for hanging laundry that needs to be dried, or for swimwear and towels that needs to be dried after use. Many recreational vehicle users are budget conscious, and coin operated laundry drying is both inconvenient and relatively expensive.

Figure 3:
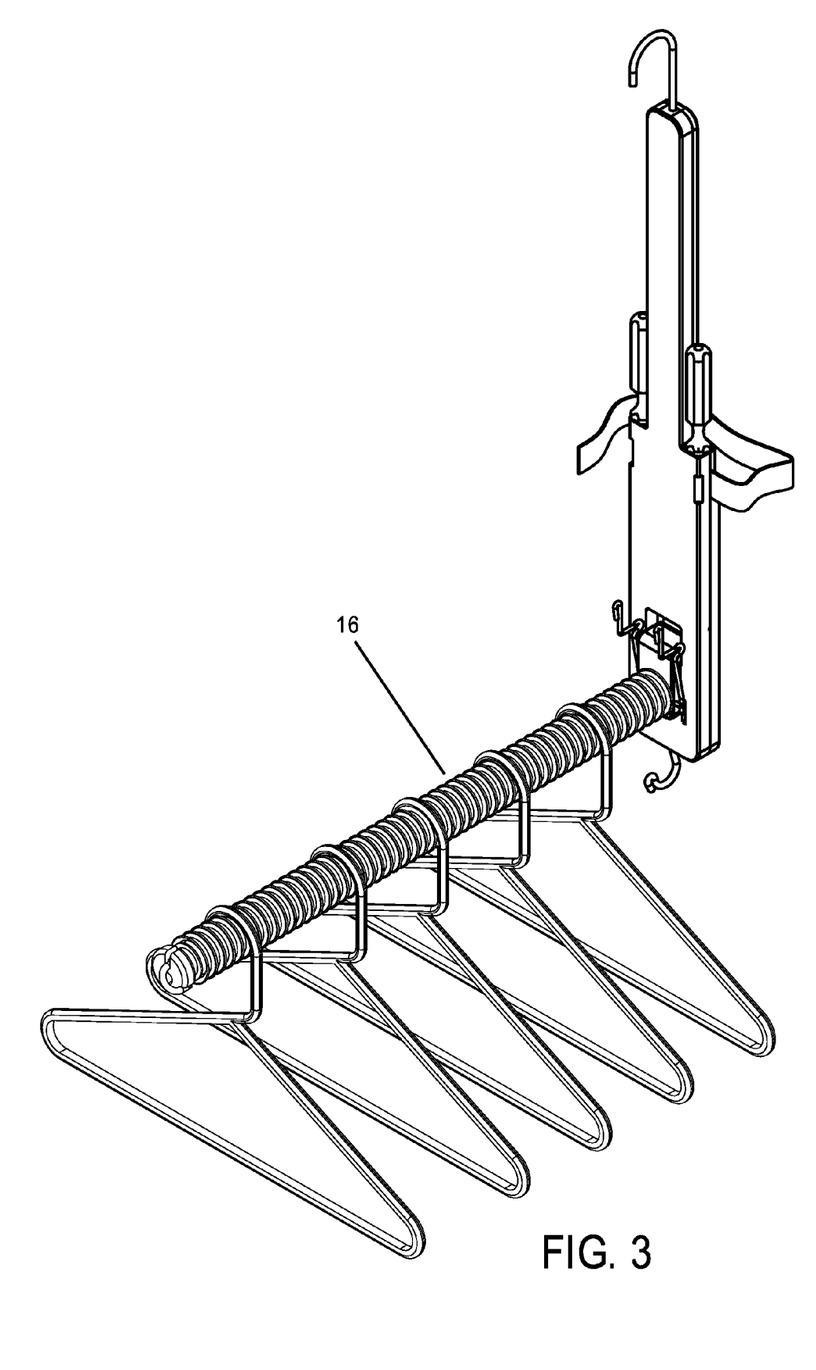
FIG. 3 shows how the present invention may be practically used to hold laundry.

FIG. 3 shows how the present invention provides practical assistance in holding laundry and assisting in drying laundry that contains moisture. As shown, the external hose 16 has a varying diameter that occurs at regular intervals, and is very useful for separating garment hangers at regular or desired intervals. The separation of laundry allows laundry to air dry efficiently. Light winds are prevented from causing the clothing to slide on a metal tube, for example, with the consequence of pushing the clothing together. Also, the external covering hose 16 is flexible and telescopes along with the telescoping tube it is covering.

Figure 4:
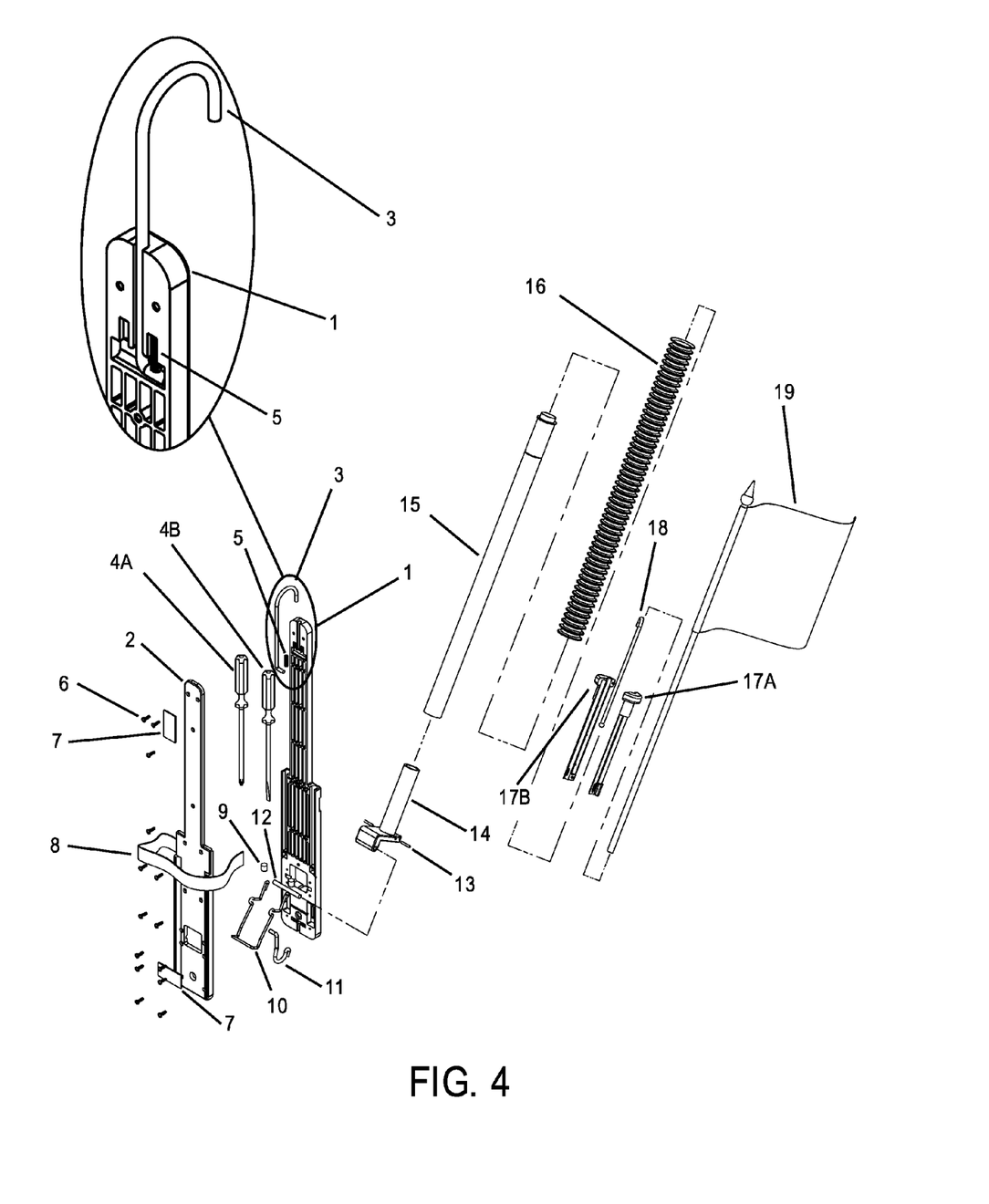
FIG. 4 shows an exploded view of an assembly of the present invention.

FIG. 4 shows one embodiment of an exploded view of an assembly of the present invention. A two part mounting base with a top base 1 and a bottom base 2, that combined together become a mounting base, are put together by screws 6. Alternately, another common hardware method is employed to join the top and bottom base. The mounting base is more simply referred to as the base. When combined, the two part mounting base has a substantially uniform thickness. However, this is only one embodiment and varying thicknesses are incorporated into the base in other embodiments.

The upper 3 mounting hook and an extendable hook 18 are incorporated into the design for convenient mounting to a variety of temporary settings which include awnings, various recreational vehicle structures, recreational vehicle ladders, truck parts, trees, lamp posts, signs, ropes, and wires that are site available for supporting a clothing bar.

Flathead 4A and Phillips 4B screwdrivers are inserted into the base for convenient user access. The screwdrivers are of a variety type or variety size. The screw driver mounting preferably includes magnets 9 so the screwdrivers do not fall out if the MPRVGB base is not vertical.

A spring 5 is incorporated with or attached to the upper hook 3 to provide for convenient retraction. Non-skid (high friction) pads 7 along with a hook and loop fastener system 8 are used to hold the base against a structural support and prevent it from sliding. A pivot stop 10 is used to hold and support the telescoping tube in place when it is used to support garments. The pivot stop 10 also restricts the end rotation of the telescoping tube 15 to substantially 90 degrees. The telescoping tube 15 is thereby constrained to rotate only between parallel to the base and approximately perpendicular to the base. The pivot stop 10 is also designed to hold the telescoping tube 15 at a fixed angle, such as 45 degrees from vertical, to allow the telescoping tube 15 to become a support for an external flag 19 for decorative purposes. A pivoting shaft 12 or pin is used to allow the telescoping tube to rotate, and the pivoting shaft 12 is incorporated into the base in a way to allow it to rotate with little translation.

A pivot tube 14 is attached to a small pivoting base 24 by glue or a threaded connection, and a telescoping tube 15 is attached to, and projects outwardly from the pivot tube 14. A roll pin 13 passes through the small pivoting base 24. The telescoping tube is covered by a hose 16 which is a made up of a flexible material with varying diameters at regular intervals. The hose preferably extends with the telescoping tube, but this is not a requirement and optionally only partially covers the telescoping tube. Two end inserts A & B 17A, 17B are combined together into a single end insert, and are inserted into the free rotating end of the telescoping tube 15. The end insert provides openings for a flag 19 and an extendable hook 18 that can be used to hang the MPRVGB. A optional spring is molded into the single end insert to hold the extendable hook 18 in the retracted position.

An alternate embodiment for the telescoping tube is to use a pair of overlapping elongated flat metal bars with notches in them. The notches would allow an extension by increments and the notches would allow simple interlocking to a desired length. A wire or a clamp would suffice to engage the notches and fix the length of the garment bar. Various sliding mechanical guides are additionally useful for convenience in extending the length.

Figure 5:
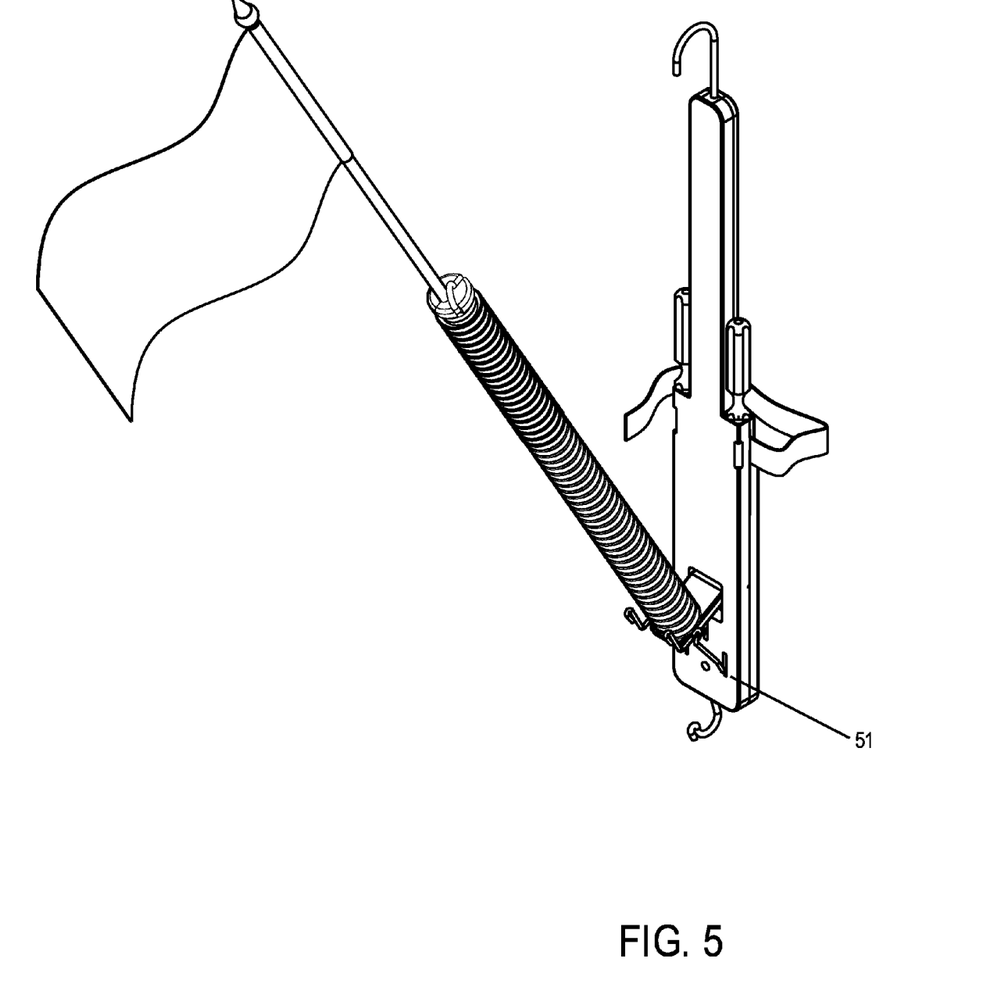
FIG. 5 shows the present invention used as flag holder.

FIG. 5 illustrates how the present invention is used as a flag holder.

The MPRVGB has other convenient uses. In another embodiment of the present invention, the lower hook 11 is used for hanging flexible garbage bags or rigid garbage containers. Also, the telescoping tube 15 is used for holding paper towels. These convenience features are important embodiments, and expand the usefulness of the present invention.

Figure 6A:
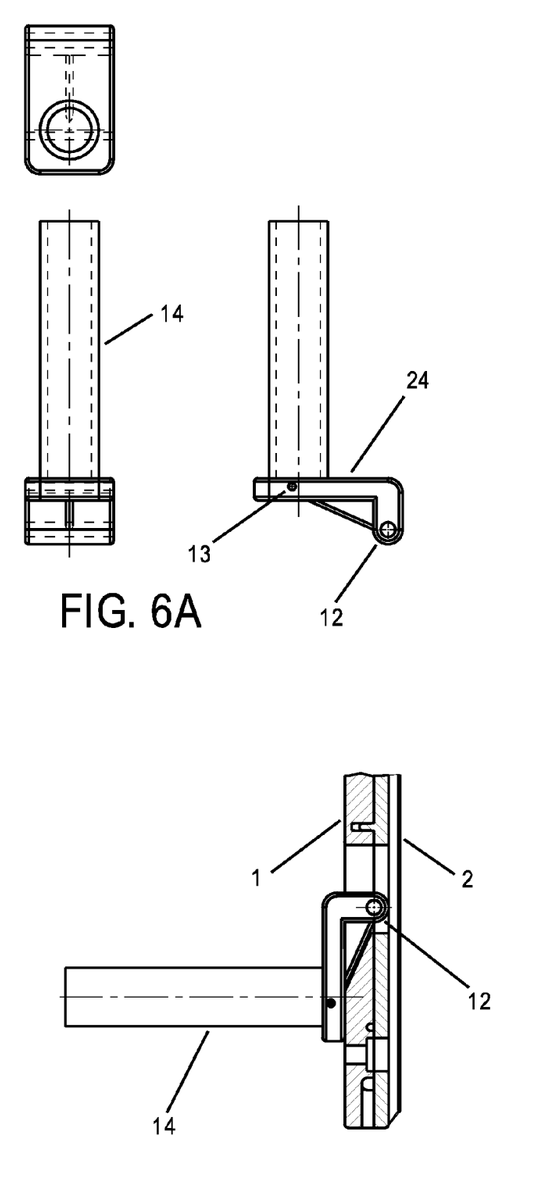
FIG. 6A-B shows details of the present invention related to the pivot point of the extension tube, and the extension tube.
Figure 6B:
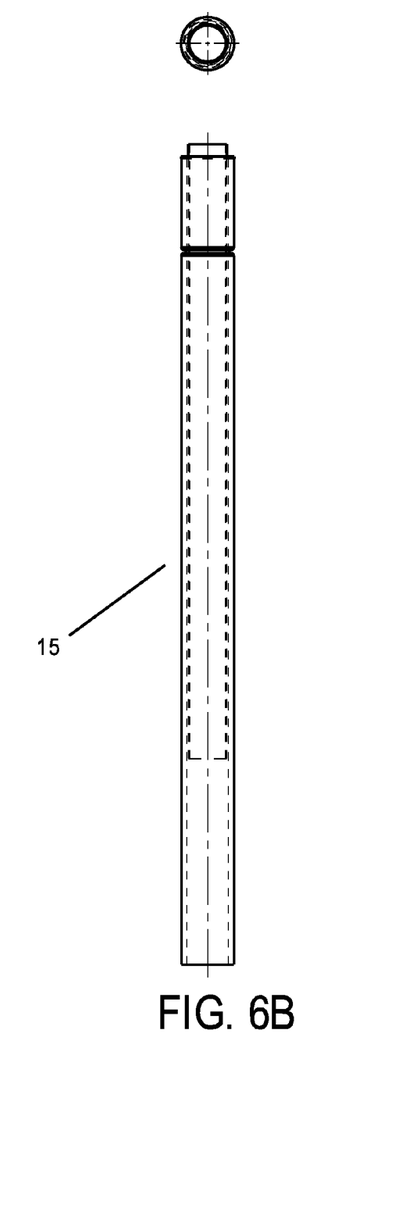

FIG. 6A-B shows a close up of the present invention related to the pivot point of the extension tube, and the extension tube respectively. In FIG. 6A, the pivot tube 14, the roll pin 13, and the pivoting shaft 12 are shown in close up. The pivot tube 14 is rigidly attached to a pivoting base 24 such as by screwing it in, or by a permanent adhesive. The roll pin 13 is used to hold the telescoping tube at a desired angle as a flag holder, for example. A rigid wire 51 (FIG. 5) is used to capture the roll pin 13 which extends past the outside diameter of the pivot tube 14. A front view, side view, and top view are shown. In FIG. 6B, the extension tube 15 assembly is shown from a side view and an end view.

Figure 7:
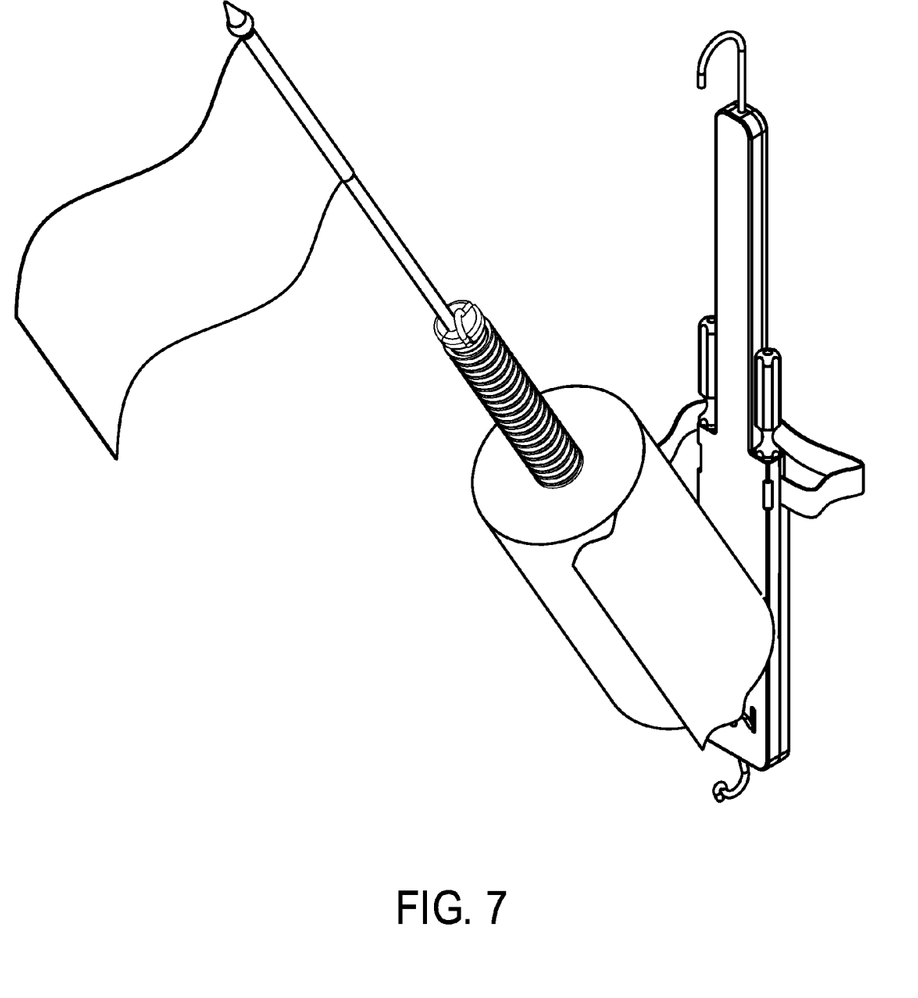
FIG. 7 shows an embodiment of the present invention where the garment bar is used to hold a roll of paper towels.

FIG. 7 shows an embodiment of the present invention where the garment bar (i.e. telescoping tube) is used to hold a paper towel roll. As shown, the garment bar is in the flag holding position, but this is not a requirement. The garment bar may also be used to hold paper towels in the horizontal position.

Figure 8:
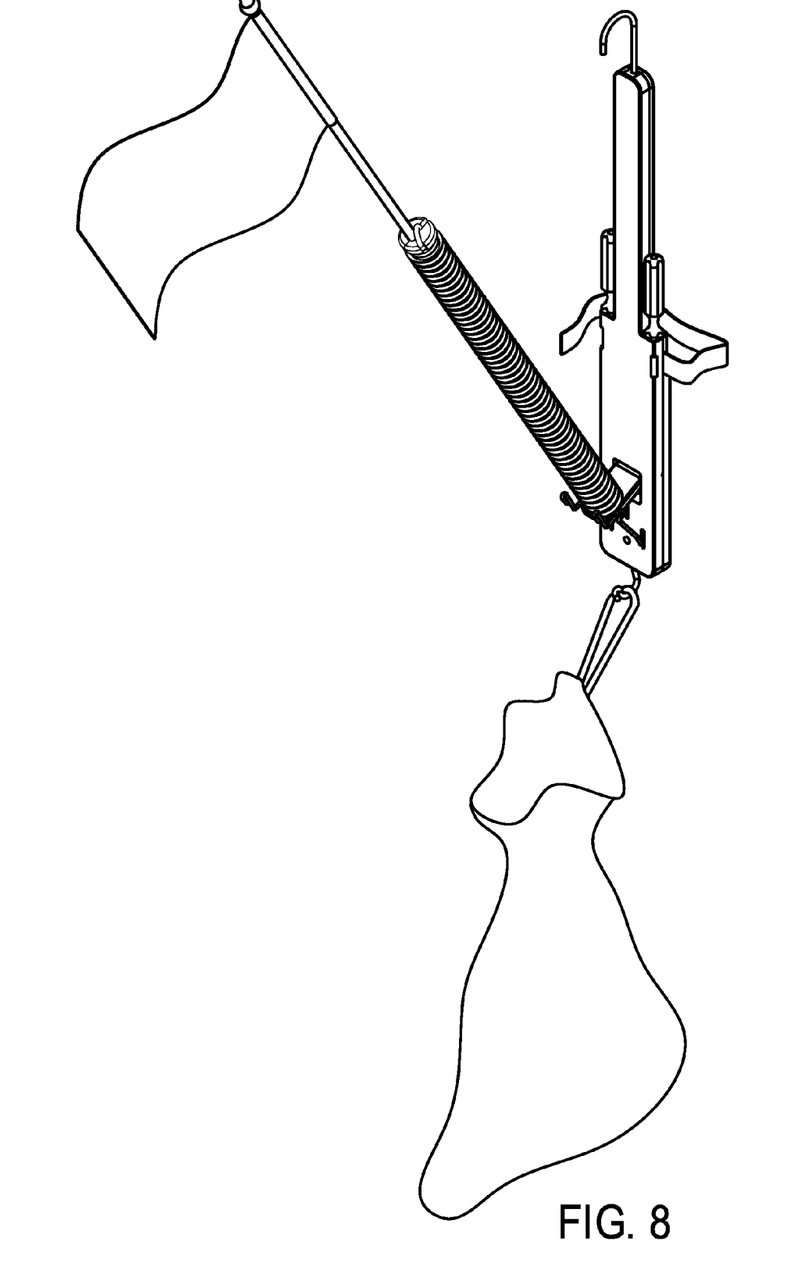
FIG. 8 shows an embodiment of the present invention where a hook on the base is used to hold a trash receptacle.

FIG. 8 shows an embodiment of the present invention where a hook on the base is used to hold a trash receptacle. The receptacle is a flexible bag as shown in one embodiment, and in another embodiment is a rigid container (not shown).

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

We claim:

1. A multipurpose garment bar that is removably attachable to a rigid structure comprising:
   a) a telescoping tube,
   b) a base, wherein said base is elongated,
   c) wherein one end of said telescoping tube is attached to a rotatable fixture that pivots about an axis located substantially near one end of said base,
   d) wherein said telescoping tube is mechanically constrained to rotate substantially 90 degrees about said axis, and said telescoping tube rotates between substantially parallel to said base and substantially perpendicular to said base,
   e) wherein said telescoping tube is used to support garments,
   f) wherein said base is removably attachable to said rigid structure using hook and loop straps, g) wherein said telescoping tube is at least partially covered by an external flexible covering that has a varying diameter at regulated intervals for the purpose of separating garment hangers, h) wherein said external flexible covering extends along with said telescoping tube, and i) wherein said telescoping tube incorporates an opening to receive a flag, and said telescoping tube is configured to be positioned at a substantially 45 degree angle from vertical by a stop located near said axis.

2. The multipurpose garment bar according to claim 1 wherein said telescoping tube is pivoted to be parallel to said base when stored.

3. The multipurpose garment bar according to claim 1 wherein said base is additionally removably attachable to said rigid structure by a hook that is incorporated into the freely rotating end of said telescoping tube and is used to support said telescoping tube.

4. The multipurpose garment bar according to claim 1 wherein said rigid structure is an awning on a recreational vehicle, van, or truck.

5. The multipurpose garment bar according to claim 1 wherein said telescoping tube is constrained in rotation by use of said stop, wherein said stop is configured to hold said telescoping tube at a substantially 45 degree angle that is useful to hold a protruding flag from a free end of said telescoping tube.

6. The multipurpose garment bar according to claim 1 wherein high friction pads are placed between said base and said rigid structure, and said base includes said hook and loop straps.

7. The multipurpose garment bar according to claim 1 wherein said telescoping tube is used to hold paper towels.

8. The multipurpose garment bar according to claim 1 wherein a hook that is incorporated into said base is used to hold a flexible or rigid garbage container.

9. A multipurpose garment bar that is removably attachable to a rigid structure comprising:

a) an elongating garment support member, b) a base, c) wherein one end of said elongating garment support member is attached to a rotatable fixture that pivots about an axis located substantially near one end of said base, d) wherein said elongating garment support member is mechanically constrained to rotate substantially 90 degrees about said axis, and said elongating garment support member rotates between substantially parallel to said base and substantially perpendicular to said base, e) wherein said base is removably attachable to said rigid structure using hook and loop straps, f) wherein said elongating garment support member is at least partially covered by an external flexible covering that has a varying diameter at regulated intervals, g) wherein said external flexible covering extends along with said elongating garment support member, and h) wherein said telescoping tube has a free rotating end opposite said one end of said telescoping tube which incorporates an opening receiving an insert providing openings which are configured to receive a flag and an extendable hook.

10. The multipurpose garment bar according to claim 9 wherein high friction pads are placed between said base and said rigid structure, and said base includes said hook and loop straps.

11. The multipurpose garment bar according to claim 9 wherein said base incorporates a hook to hold a garbage container, and said elongating support member is used to support a roll of paper towels.

12. The multipurpose garment bar according to claim 9 wherein said rigid structure is an awning on a recreational vehicle, van, or truck.

* * * * *